US012398596B2

(12) United States Patent
Sabol et al.

(10) Patent No.: US 12,398,596 B2
(45) Date of Patent: Aug. 26, 2025

(54) ACCESSING APPARATUS

(71) Applicants: John Frank Sabol, East Chicago, IN (US); John A. Sabol, East Chicago, IN (US)

(72) Inventors: John Frank Sabol, East Chicago, IN (US); John A. Sabol, East Chicago, IN (US)

( * ) Notice: Subject to any disclaimer, the term of this patent is extended or adjusted under 35 U.S.C. 154(b) by 729 days.

(21) Appl. No.: 17/835,570

(22) Filed: Jun. 8, 2022

(65) Prior Publication Data

US 2022/0412164 A1 Dec. 29, 2022

Related U.S. Application Data

(60) Provisional application No. 63/213,996, filed on Jun. 23, 2021.

(51) Int. Cl.

| | |
|---|---|
| ***E06C 1/12*** | (2006.01) |
| ***E06C 1/39*** | (2006.01) |
| ***E06C 7/42*** | (2006.01) |

(52) U.S. Cl.
CPC .................. *E06C 1/12* (2013.01); *E06C 1/39* (2013.01); *E06C 7/42* (2013.01)

(58) Field of Classification Search
CPC ..... E06C 1/12; E06C 1/39; E06C 7/42; E06C 5/02; E06C 7/48; E06C 1/397
See application file for complete search history.

(56) References Cited

U.S. PATENT DOCUMENTS

| | | | | |
|---|---|---|---|---|
| 1,258,048 A * | 3/1918 | Ryder | ...................... | E06C 1/397 182/64.1 |
| 11,187,000 B2 * | 11/2021 | Neubauer | ................. | E04G 1/30 |
| 2001/0038788 A1 * | 11/2001 | Robinson | .................. | B66F 9/18 414/607 |
| 2019/0177987 A1 * | 6/2019 | Neubauer | ................. | E04G 7/34 |
| 2021/0348399 A1 * | 11/2021 | Neubauer | ............... | E06C 1/397 |

* cited by examiner

*Primary Examiner* — Rodney Mintz

(57) ABSTRACT

An apparatus used to assist workers with entry into a barge that allows a user to go over the barge wall and descend to access the bottom of the barge. The apparatus includes a first pathway 3, a landing 17 and a second pathway 4. The first pathway 3 has a low end 21 and a high end 22 and the second pathway has a landing end 23. The high end 22 is elevated from the low end 21 with the high end 22 being attached to the landing 17. The landing end 17 is attached to the landing. There is a frame 18 and at least one foot 2 attached to and supporting the frame 18. The low end 21 is attached to the frame 18. Included is a support segment 16 that has a first end 25 and a second end 24. The first end 25 is fixedly attached to the second pathway 4. There is also a holder 7 that is rotatably attached to the second end 24. And a ladder 6 that is slidably attached to that holder 7.

17 Claims, 3 Drawing Sheets

ACCESSING APPARATUS

CROSS-REFERENCE TO RELATED APPLICATIONS

The present application claims the benefit of U.S. Provisional Patent Application No. 63/213,996, filed Jun. 23, 2021, the entirety of which is hereby incorporated by reference.

BACKGROUND OF THE INVENTION

Field of the Invention

The present invention relates to a ladder or scaffold, and particularly to an accessing apparatus provided with a mobile base to transport the apparatus from a first position to a second position and with means to lower portions allowing for transportation and to raise the portions back to an elevated position after transportation.

Description of the Related Art

The inventors noted that the great size of transport containers, such as a flat bottom vessel or barge to name one example, make entry into such containers difficult for human beings, especially from a top side.

For example, a loaded barge poses little problem for entry into the hull because its top is generally at the same eight as a dock that it parks alongside. Workers can walk right onto the barge. A loaded barge holds several hundreds of thousands of pounds of cargo. So, as the cargo is unloaded, the barge rises several feet above the dock's level. This makes walking, or even leaping, onto the barge impossible without assistance. Clearly, getting into a transport container, such as a barge, to do work is a problem when loading and unloading these huge containers.

Still using a barge as an example, though the main problem is getting into a barge after it rises, there are barge control issues. There is a problem with accessing the near top of the barge, commonly known as the deck area or transport container deck, to adjust the dock lines that hold the barge to the dock. Dock lines need adjusting when the barge is being loaded or unloaded because the needed line length changes as the barge moves up and down. The dock lines are adjusted on the barge's deck so getting workers to that level of the barge is a problem. There are other "near top" locations on other transport containers too that pose similar access, or reach, problems.

Presently, the airline industry loads its containers using a ladder or manlift. However, in our 35 years of experience in the powder and bulk material handling industry, we have never seen such an application work for the reach and access requirements needing a sort of negative reach access i.e. going up then down into a container. Open hopper railcars, to name another type of transport container, too require such negative reach access to clean the railcar bottom as do many other large transport containers.

Containers such as mentioned all have the same problem, that is, a user needs to get above the edge of the container and then back down to the floor of the container. These containers typically do not have ladders attached to the inside of the container so getting to the floor of these containers is difficult.

There is a need in the industry for an apparatus that allows accessing a transport container, from a top side for example, and getting down into the container. Such an apparatus would allow workers to go below the ground level within the container. We noticed that this negative reach capability, cantilevering, is not currently available in the industry.

SUMMARY

The present invention is directed to an apparatus that satisfies this need. We envisioned a cantilevering stairway and platform combination with various accessories including, naming one example, a ladder and its attachment allowing workers to move up, access, and get down into transport containers to do their work. We have referred to our invention as a barge access system.

The present invention is an apparatus for use with a transport container that allows a user to move it near a barge, or other like container, and go over the container wall and descend to access the bottom of the container. The apparatus includes a first pathway, a landing and a second pathway. The first pathway has a low end and a high end and the second pathway has a landing end. The high end is elevated from the low end with the high end being attached to the landing. The landing end is attached to the landing.

There is a frame and at least one foot which is attached to the frame and supporting the frame. The low end is attached to the frame. It also includes a support segment that has a first end and a second end. The first is fixedly attached to the second pathway away from the landing end. There is also a holder that is rotatably attached to the second end. And a ladder that is slidably attached to that holder.

BRIEF DESCRIPTION OF THE SEVERAL VIEWS OF THE DRAWINGS

These and other features, aspects and advantages of the present invention will become better understood with regard to the following description, appended claims, and accompanying drawings where:

DESCRIPTION

Overview.

Figure 1:
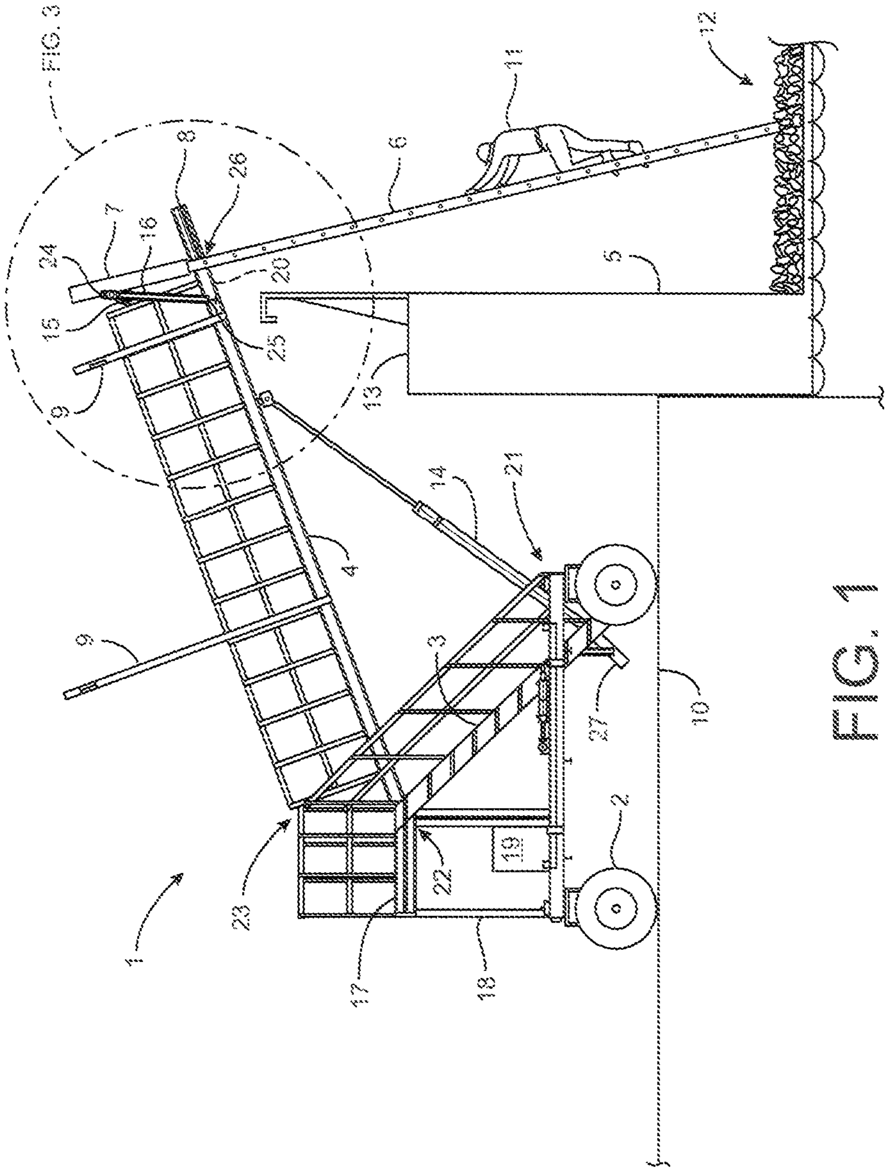
FIG. 1 shows a perspective view of an embodiment of the present invention being positioned away from the edge of a transport container.

As shown in FIG. 1, a perspective view of an embodiment of the present invention being positioned away from the edge of a transport container 5 comprises an assisting apparatus 1 having a walking path that is made up from a first pathway 3, a landing 17, and a second pathway 4. There being at least one foot 2, wheels for instance, attached to a frame 18. The first pathway 3 and the second pathway 4 are connected to the landing and are situated to each other, in this example, to form a 180 degree turn.

The frame 18 has attached to it an extendable and retractable arm 14. This extendable and retractable arm 14 is connected at one end to the frame 18 and the other end to the second pathway 4.

The second pathway 4 has mounted on it at least one ladder support bar 9 and a support segment 16. There is a holder 7 attached to the support segment 16. An extendable portion 8 slides in a rail FIG. 2 at 204. Though not shown doing this, the extendable portion 8 is useful for accessing the transport container's deck 13 of a transport container 5, in this example a barge. We have found that the extendable portion 8 can in fact move below the dock 10 in situations where water level is low or where dock levels are high.

The interior of the barge, transport container 5, which is parked alongside a dock 10 needs to be worked on. A worker 11 has traversed the walking path after adjusting the extendable and retractable arm 14 to position the second pathway 4 and unlatching a ladder 6 from the ladder support racks 9. The ladder 6 was slid through the holder 7 and flipped over the transport container 5. The worker 11 is then able to descend the ladder 6, ideally checking its angle using an angle indicator 15, and entering into the barge 5 and, in this example, clean the material at the bottom of the barge 12.

Figure 2:
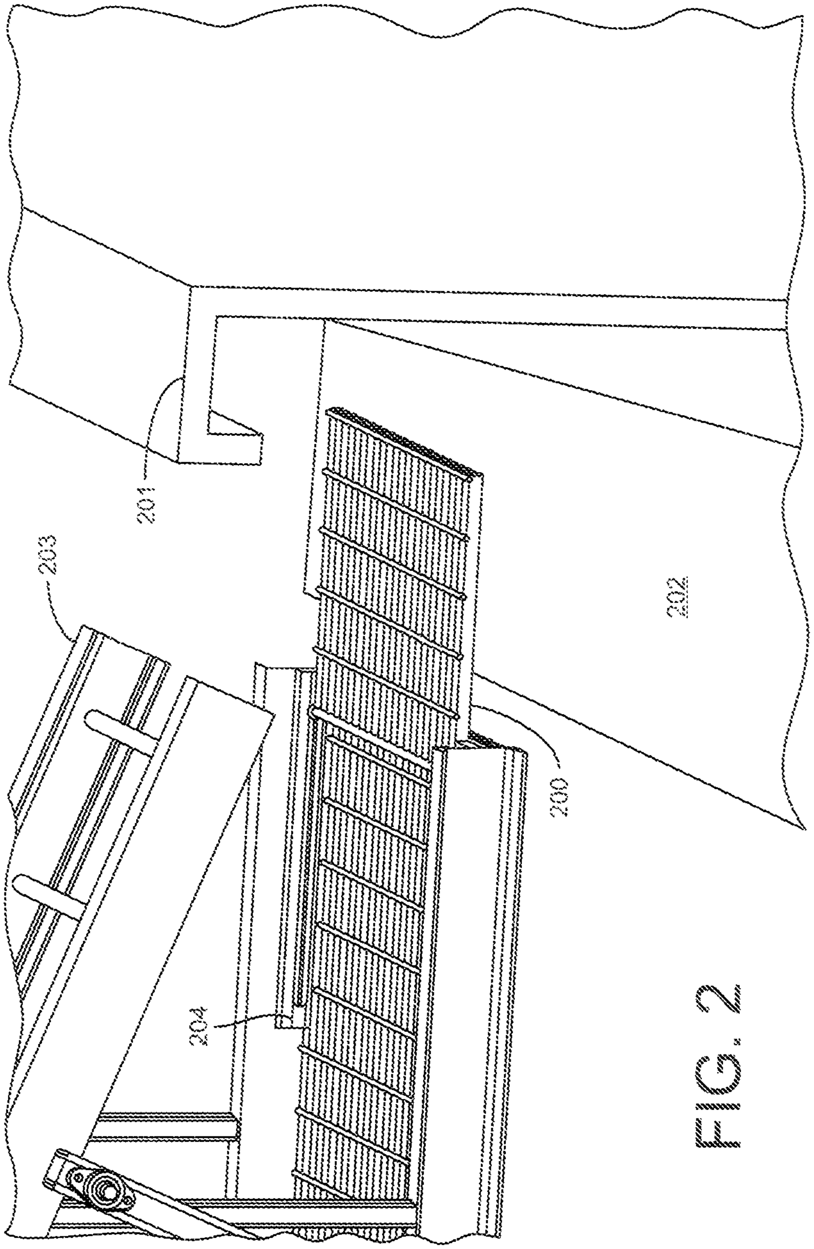
FIG. 2 shows a perspective view of an embodiment of the present invention.

As shown in FIG. 2, a perspective view of an embodiment of the present invention comprises a transport container 201 having a transport container deck 202. An extendable portion 200 slidably attached to a rail 204. A ladder 203 is stowed.

Figure 3:
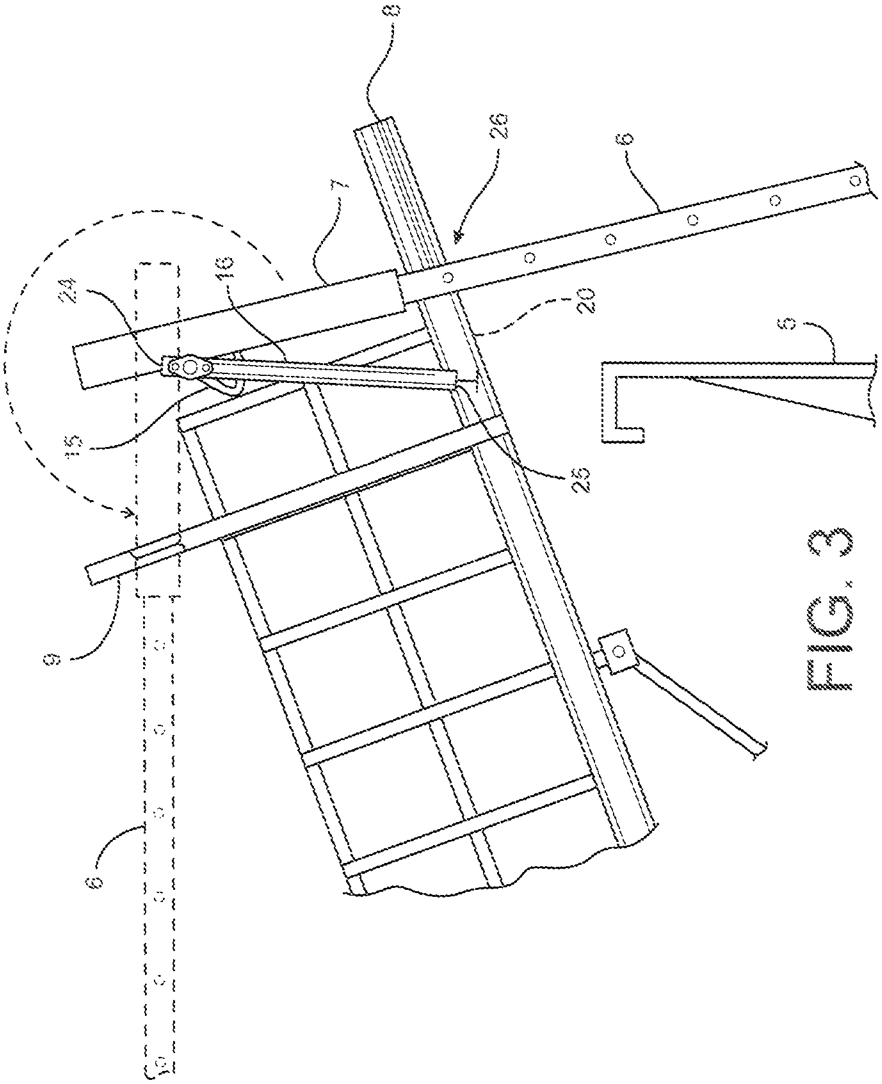
FIG. 3 shows a detailed view of portions of the embodiment of the present invention as indicated in FIG. 1.

More specifically, and referring to the FIGS. 1, 2 and 3, an embodiment of the inventive apparatus 1 for use with a transport container 5, has a place, a walking path for instance, for a worker 11 to traverse made of a first pathway 3, a landing 17 and a second pathway 4. The first pathway 3 has a low end 21 and a high end 22 and the second pathway 4 has a landing end 23. Like a staircase, the high end 22 is elevated from the low end 21 and the high end 22 is attached to the landing 17. Thus, is provided a walking path for users to walk up the first pathway 3 and arrive at a landing 17 area to rest, adjust, or carry out various other acts. Then a user 11 can continue in the walking path because the landing end 23 is attached to the landing 17. The landing end 23 is stationary relative to the other end 26 of the second platform 4 which moves up or down as needed by the user 11. Though we envision embodiments where the landing end need not be stationary in relation to the other end.

An embodiment of our invention has a frame 18 with at least one foot 2 being attached to the frame 18. The at least one foot 2 is supporting the frame 18. The low end 21 being attached to the frame 18.

One example has a support segment 16 which has a first end 25 and a second end 24. The first end 25 being fixedly attached to the second pathway 4 distal, away from, the landing end 23 and closer to the other end 26, sometimes referred to as the barge end. We could envision this first end 25 being attached elsewhere on the apparatus but feel this is the best mode.

An embodiment could have a holder 7 that is rotatably attached to the second end 24, or sufficiently near to it, and a ladder 6 that is slidably attached to the holder 7.

In alternative embodiments, the support segment 16 extends away from the second pathway 4, or the ladder 6 is oriented laterally to the second pathway 4. Alternatively, an embodiment could include a ladder support bar 9 that is attached to the second pathway 4, the ladder support bar 9 extending away from the second pathway 4. Too an alternative could include an extendable portion 8, a rail 20, the second pathway 4 having a barge end 26, the rail 20 being attached to the barge end 26, and the extendable portion 8 being slidably attached to the rail 20, which could be rotatably attached. The embodiment of FIG. 2 more clearly shows an extendable portion 200 slidably attached to the rail 204. FIG. 3 shows an enlarged view of many of these elements.

We envision alternate embodiments where the apparatus is further comprising a slip joint 27, that is fixedly attached to the frame 18. An extendable and retractable arm 14 that is connected at one end to the slip joint 27 and at another end to the second pathway 4.

Another embodiment of our inventive apparatus would have a ladder 6 extending into the transport container 5 and below a grade 10 where the at least one foot 2 rests thereby allowing a user 11 to utilize the ladder 6 and get to material 12 within the transport container 5.

An alternative embodiment could be one where the at least one foot 2 is a wheel or could be one that has a center of gravity which allows the apparatus to remain balanced in all positions without being anchored or one where it can be operated remotely by the user.

Another embodiment of the apparatus could have an angle indicator 15 that is fixedly attached to the support segment 16.

Too, where an embodiment has an extendable portion 8, it could further include a transport container deck 13. Then the extendable portion 8 (or 200 in FIG. 2) could be extendable from the second pathway 4 to the transport container deck 13 (or 202 in FIG. 2).

An embodiment of our inventive apparatus for use with a transport container 5 would comprise a first pathway 3, a landing 17, and a second pathway 4. The first pathway 3 having a low end 21 and a high end 22 and the second pathway 4 having a landing end 23. The high end 22 being elevated from the low end 21. The high end 22 being attached to the landing 17 and the landing end 23 being attached to the landing 22.

It would have a frame 18 with at least one foot 2 being attached to the frame 18 and supporting the frame. The low end 21 too being attached to the frame 18. It has a support segment 16 that has a first end 25 and a second end 24. The first end 25 being fixedly attached to the second pathway 4 distal, away from, the landing end 23. The support segment 16 would be extending away from the second pathway 4.

An embodiment would have a holder 7 that is rotatably attached to the second end 24. A ladder 6, being oriented laterally to the second pathway 4 and slidably attached to the holder 7. There would be a ladder support bar 9 attached to the second pathway 4 and extending away from the second pathway. An extendable portion 8 and a rail 20 that is pivotally attached to a barge end 26 of the second pathway 4 are included. The extendable portion 8 being slidably attached to the rail 20. Too there is a slip joint 27 and an extendable and retractable arm 14. The slip joint 27 being attached to the frame 18 and the extendable and retractable arm 14 connected at one end to the slip joint 18 and at another end to the second pathway 4.

The ladder 6 of the embodiment would be capable of extending below the at least one foot 2 and into the transport container 5. Too, with a transport container deck 13 the extendable portion 8 is extendable from the second pathway 4 to the transport container deck 13.

Such an embodiment would have the at least one foot 2 as a wheel and include a control unit that is operatively attached to the frame 19. The control unit is a combination of components that are common in the industry used to control the various movements and indications of the apparatus 1. We envision that all of the needed cabling, hoses, and communications would start or end at the control unit. Too an angle indicator 15 is fixedly attached to the support segment 16. Interestingly, we found it useful that the inventive apparatus would allow the control unit 19 to be operated remotely.

Too, the invention provides a design that does not interfere with a material lay down area. An embodiment of the present invention provides a safety strut (the extendable and retractable arm 14 together with the slip joint 27) which provides self protection for the second pathway 4. This also allows the apparatus 1 to meet OSHA ramp angle requirements and a maximum barge, for example, height with extra height for tolerance. This is like a slip joint that lets a ramp be lifted by an external source.

We envision a worker using an embodiment of our inventive apparatus would have to turn 180 degrees from the second pathway 4 to climb down the ladder 6. The land angle will change but only by 40 degrees total at a maximum 20 degrees up and down from horizontal. The safety strut is to protect the hinged second pathway. The hydraulic cylinder, an example of an extendable and retractable arm 14, that raises the second pathway 4 will be mounted to or in a tube and attached to the frame or attached to the frame 18 directly and another end fixed at the second pathway 4. This would primarily protect the second pathway when unloading a transport container 5, such as a barge, if the apparatus is parked in a way that it is above the barge. When unloading the barge and the barge starts rising out of the water as the weight is removed it could contact the second pathway 4. The slip joint 27 and extendable and retractable arm 14 together will work together and allow the barge to move the second pathway 4 without causing damage to the apparatus 1.

We note that an embodiment of the apparatus utilizes cantilevering to allow access to transport containers 5 that is faster and significantly safer than ladders alone. For this reason too, it is good to have an angle indicator 15.

The angle indicator 15 can be shaped like a hook to allow the center of mass to be perfectly centered to the rotation point. This allows the indicator's gauge, common in the art, to always level itself with gravity since the angle indicator will rotate freely on a pin that is securely attached to the support segment 16, or anywhere else on the apparatus that makes sense. This is required because users want to know the ladder angle perpendicular to gravity and not the ramp. If measured to the second pathway, then the changing second pathway angle would need be subtracted from the changing ladder angle and that is not user friendly. There is a ladder variable angle set bracket that is fixed to the holder 7 and is slotted to allow some rotation of the ladder to protect the ladder if the barge moves. The different slots are for different ladder angles based on different second pathway angles.

The present invention provides an extendable portion 8 mounted in a pivotable rail 20 to account for various impact events, such as from a moving barge. Too, our invention provides for a center of gravity ("COG") that is more suited to a cantilever action. We noted that the COG is important to keep this moveable system stable and well balanced in all positions. There is no need for anchoring the system yet there is a need to maintain system balance from the shifting weights involved during use and we found the best system means for doing so is via a centered COG. If the system was anchored, then the COG is less important but the structural analysis is more important to assure addressing the various forces encountered during use without breaking such an anchored design.

Although the present invention has been described in considerable detail with the reference to certain preferred versions thereof, other versions are possible. For instance, the apparatus may be useful for work over a wall, could be remotely operated, or could have different types of feet besides wheels. Therefore, the spirit and scope of the appended claims should not be limited to the description of the preferred versions contained herein.

Any element in a claim that does not explicitly state "means for" performing a specified function, or "step for" performing a specific function, is not to be interpreted as a "means" or "step" clause as specified in 35 U.S.C. § 112, ¶6. In particular, the use of "step of" in the claims herein is not intended to invoke the provisions of 35 U.S.C. § 112, ¶6.

What we claim is:

1. An apparatus for use with a transport container, the apparatus comprising:
- a first pathway;
- a landing;
- a second pathway;
- the first pathway having a low end and a high end;
- the second pathway having a landing end;
- the high end being elevated from the low end;
- the high end being attached to the landing;
- the landing end being attached to the landing;
- a frame;
- at least one foot;
- the at least one foot being attached to the frame;
- the at least one foot supporting the frame;
- the low end being attached to the frame;
- a support segment;
- the support segment having a first end and a second end;
- the first end being fixedly attached to the second pathway distal the landing end;
- a holder;
- the holder being rotatably attached to the second end;
- a ladder;
- the ladder being slidably attached to the holder.

2. The apparatus of claim 1 wherein the support segment extends away from the second pathway.

3. The apparatus of claim 1 wherein the ladder is oriented laterally to the second pathway.

4. The apparatus of claim 1 further comprising:
- a ladder support bar;
- the ladder support bar being attached to the second pathway;
- the ladder support bar extending away from the second pathway.

5. The apparatus of claim 1 further comprising:
- a slip joint;
- the slip joint being fixedly attached to the frame;
- an extendable and retractable arm;
- the extendable and retractable arm being connected at one end to the slip joint and at another end to the second pathway.

6. The apparatus of claim 1 further comprising:
- the ladder being configured to extend into the transport container and below a grade where the at least one foot rests thereby allowing a user to utilize the ladder and get to material within the transport container.

7. The apparatus of claim 1 wherein the at least one foot is a wheel.

8. The apparatus of claim 1 further comprising a center of gravity which allows the apparatus to remain balanced in all positions without being anchored.

9. The apparatus of claim 1 wherein the apparatus is configured to be operated remotely.

10. The apparatus of claim 1 further comprising:
- an angle indicator;
- the angle indicator being fixedly attached to the support segment.

11. The apparatus of claim 1 further comprising a control unit being attached to the frame.

12. The apparatus of claim 1 further comprising:
an extendable portion;
a rail;
the second pathway having a barge end;
the rail being attached to the barge end;
the extendable portion being slidably attached to the rail.

13. The apparatus of claim 12 further comprising:
a transport container deck;
the extendable portion being extendable from the second pathway to the transport container deck.

14. The apparatus of claim 12 wherein the rail is pivotally attached to the second pathway.

15. An apparatus for use with a transport container, the apparatus comprising:
a first pathway;
a landing;
a second pathway;
the first pathway having a low end and a high end;
the second pathway having a landing end;
the high end being elevated from the low end;
the high end being attached to the landing;
the landing end being attached to the landing;
a frame;
at least one foot;
the at least one foot being attached to the frame;
the at least one foot supporting the frame;
the low end being attached to the frame;
a support segment;
the support segment having a first end and a second end;
the first end being fixedly attached to the second pathway distal the landing end;
the support segment extending away from the second pathway;
a holder;
the holder being rotatably attached to the second end;
a ladder;
the ladder being oriented laterally to the second pathway;
the ladder being slidably attached to the holder;
a ladder support bar;
the ladder support bar being attached to the second pathway;
the ladder support bar extending away from the second pathway;
an extendable portion;
a rail;
the rail being pivotally attached to a barge end of the second pathway;
the extendable portion being slidably attached to the rail;
a slip joint;
an extendable and retractable arm;
the slip joint being attached to the frame;
the extendable and retractable arm being connected at one end to the slip joint and at another end to the second pathway;
the ladder being configured to extend below the at least one foot and into the transport container;
a transport container deck;
the extendable portion being extendable from the second pathway to the transport container deck;
the at least one foot being a wheel;
a control unit being operatively attached to the frame;
an angle indicator;
the angle indicator being fixedly attached to the support segment.

16. The apparatus of claim 15 wherein the control unit is configured to be operated remotely.

17. The apparatus of claim 15 wherein the transport container is a barge.

* * * * *